US006879891B1

(12) United States Patent
Bederna

(10) Patent No.: US 6,879,891 B1
(45) Date of Patent: Apr. 12, 2005

(54) METHOD AND DEVICE FOR MONITORING A COMPUTING ELEMENT IN A MOTOR VEHICLE

(75) Inventor: Frank Bederna, Crespellano (IT)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/958,979

(22) PCT Filed: Apr. 15, 2000

(86) PCT No.: PCT/DE00/01099

§ 371 (c)(1), (2), (4) Date: Dec. 12, 2001

(87) PCT Pub. No.: WO00/63546

PCT Pub. Date: Oct. 26, 2000

(30) Foreign Application Priority Data

Apr. 16, 1999 (DE) ........................................ 199 17 208

(51) Int. Cl.[7] .......................... G06F 15/16; G05B 9/02; F02D 41/22

(52) U.S. Cl. .............................. 701/29; 701/81; 477/78

(58) Field of Search .............................. 701/29, 81, 76, 701/99, 107, 114; 477/78, 906; 361/23; 303/122.05, 20, 122, 122.04, 122.06; 324/772; 714/32, 55; 702/116; 123/479

(56) References Cited

U.S. PATENT DOCUMENTS 4,587,615 A * 5/1986 Takahashi .............. 364/431.11
4,598,355 A * 7/1986 Shepler et al. ................ 700/79
4,646,008 A * 2/1987 Takahashi ............ 324/158 MG
4,896,276 A * 1/1990 Saglimbeni et al. ........ 702/116
5,043,984 A 8/1991 Tomisawa et al. ............ 371/16
5,121,324 A * 6/1992 Rini et al. ............. 364/431.05
5,182,755 A * 1/1993 Sekiguchi et al. ......... 371/16.3
5,372,410 A * 12/1994 Miller et al. ........... 303/122.05
5,726,541 A * 3/1998 Glenn et al. .................. 318/16
5,890,086 A * 3/1999 Wellman et al. .............. 701/50
5,899,829 A * 5/1999 Salecker et al. .............. 477/78
6,115,653 A * 9/2000 Bergstrom et al. ............ 701/29

FOREIGN PATENT DOCUMENTS

| | | |
|---|---|---|
| DE | 196 09 242 | 11/1997 |
| DE | 196 53 429 | 7/1998 |
| WO | WO 96 13657 | 5/1996 |

* cited by examiner

*Primary Examiner*—Thomas G. Black
*Assistant Examiner*—Dalena Tran
(74) *Attorney, Agent, or Firm*—Walter Ottesen

(57) ABSTRACT

A method and an arrangement for monitoring a computing element in a motor vehicle are suggested. The computing element generates, with the aid of the program modules, at least one output quantity for controlling at least one function in the motor vehicle in dependence upon at least one input quantity. At least one program module or at least a part thereof is selected for monitoring the correct function of the computing element (12). This at least one selected module or the at least one selected part thereof or a copy is run through in the computing element (12) on the basis of test data and the result of the test data computation is compared to a pregiven result for fault detection.

10 Claims, 3 Drawing Sheets

METHOD AND DEVICE FOR MONITORING A COMPUTING ELEMENT IN A MOTOR VEHICLE

FIELD OF THE INVENTION

The invention relates to a method and an arrangement for monitoring a computing element in a motor vehicle.

BACKGROUND OF THE INVENTION

A method and an arrangement for monitoring a computing element in a motor vehicle is known from U.S. Pat. No. 5,880,568. The program structure of this computing element has at least three levels. Those programs are assigned to a first level which execute the control function, for example, the control of the power of the drive unit. Programs are assigned to a second level which serve to monitor the operation of the first level. For this purpose, a permissible value for an operating variable to be adjusted is compared to a measured or determined actual value of this variable in an illustrated embodiment of a power control for a drive unit. Programs or program parts are allocated to a third level which serve to control the sequence of the monitoring programs allocated to the second level. The sequence control takes place in the context of an inquiry-response communication with a safety component (monitoring module), which checks the correct execution of the programs of the second level on the basis of the results of the inquiry-response communication (process control). If at least one fault condition is detected via the programs of the second level and/or via the monitoring module, fault reaction measures are initiated which comprise the switch-off of the supply of the operating means or other, operation-limiting measures in the example of the control of a drive unit.

According to U.S. Pat. No. 6,125,322, a command test is executed in addition to or as an alternative to the execution control to improve the monitoring of the operability of the programs of the second level. In the context of this command test, selected programs or program parts are computed with pregiven test data and the computation result(s) are checked in the monitoring module bit-for-bit to detect errors.

What is essential in the known solutions is that the programs of the first and second levels as well as the execution control and the command test are executed in a single computing element. The monitoring of the executing programs of the second level should operate with input signals which are redundant to the input signals to be processed by the programs of the first level. This measure leads to the doubling of the sensor means. Only a small number of the input signals is available for monitoring in order to avoid the use of additional sensors because of the different extent of sensors in different vehicles. The quality of the monitoring becomes ever poorer with an increasing extent of function, especially, with an increasing extent of function of power-determining functions of a drive unit such as for control systems for engines having gasoline direct injection. An example of a function which can affect the quality of the monitoring is the learning of the stops of the accelerator pedal position transducer. If, for example, the offset of the accelerator pedal position signal is changed by this learning function, this is to be considered in the monitoring via the consideration of maximum tolerances of the end stops. This relatively large tolerance range can lead to a negative effect on the quality of monitoring.

SUMMARY OF INVENTION

It is a task of the invention to provide a monitoring for a computing element in a vehicle wherein an adequately satisfactory quality of the monitoring is ensured notwithstanding the increasing extent of functions.

A monitoring for a computing element is given in a motor vehicle with which a satisfactory monitoring of the operation of the computing element is ensured even with an increasing extent of functions and various extents of sensors in individual vehicles.

It is of special advantage that an additional monitoring level can be saved without it being necessary to do without safety standards.

In this connection, it is of special advantage that the development processes for the monitoring of the computing element become simplified because each new reliability relevant function does not require a fitting new monitoring function. The development of such new monitoring functions is thereby unnecessary.

Of special advantage is the procedure in connection with the control of a drive unit wherein a number of power-determining functions is provided.

It is further advantageous that adapting functions, which influence power-determining functions, have no influence on the quality of the monitoring function.

Especially advantageous is the selection of pregiven computing steps from the function programs for executing a command test because the computing power can be reduced in this way without having to do without reliability standards.

It is especially advantageous that, in addition to the described procedure, a monitoring is provided which is known from the state of the art and which operates in the computing element in the context of a second level.

Additional advantages will become apparent from the description of the embodiments which follows.

BRIEF DESCRIPTION OF THE DRAWINGS

The invention will be explained in greater detail in the following with respect to the embodiments shown in the drawing.

DESCRIPTION OF THE PREFERRED EMBODIMENTS OF THE INVENTION

Figure 1:
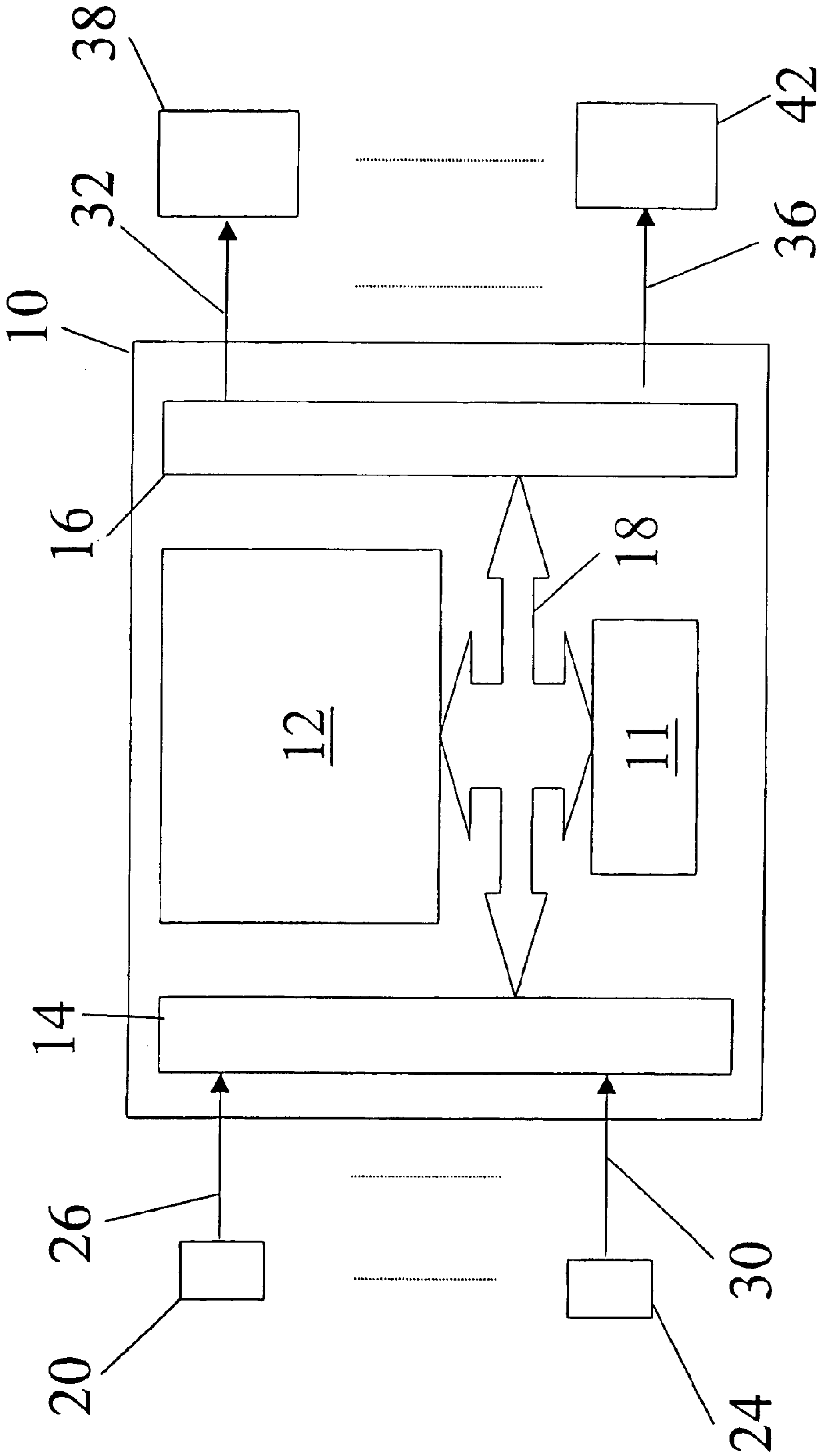
FIG. 1 shows an overview block circuit diagram of a control unit having a computing element which controls at least one operating variable in the motor vehicle, preferably the power of a drive unit.

FIG. 1 shows an electronic control apparatus 10 which includes at least a computing element 12, a monitoring module 11, an input circuit 14, and an output circuit 6. Memory components are part of the computing element 12 or are allocated thereto. The mentioned elements are connected with each other for data exchange via a communications system 18. Signals are supplied to the input circuit 14, which represent measured operating variables of the drive unit, of the drive train and/or of the motor vehicle or from which such operating variables can be derived. These signals are detected by measuring devices 20 to 24 and are supplied to the input circuit 14 via input lines 26 to 30. Furthermore, signals are outputted via the output circuit 16 which actuate operating elements for adjusting at least an operating variable of the drive unit, of the drive train and/or of the motor vehicle. The corresponding drive signal quantities are outputted to the actuating elements 38 to 42 via the lines 32 to 36.

The computer element 12 forms values for the control quantities to be outputted in the context of the programs implemented there in dependence upon the following: input signals, operating variables derived from the these input signals and/or internal quantities. These control quantities adjust the actuating elements in the sense of a pregiven control strategy. In the preferred embodiment, the control unit 10 is a control unit for controlling a drive unit of a motor vehicle. There, in a manner known per se, the position of an operator-controlled element actuable by the driver is detected and evaluated and a desired value is determined for a torque of the drive unit. This is then determined while considering desired values of other control systems received via the input circuit 14. These other control systems include, for example, a drive slip control, a transmission control, et cetera, as well as internally formed desired values (limitations, et cetera). In the preferred embodiment of an internal combustion engine, this desired value is converted into a desired value for the position of the throttle flap which is adjusted in the context of a position control loop. Depending upon the configuration of the internal combustion engine, further power-determining functions are provided which include, for example: the control of a turbocharger, an exhaust-gas recirculation, an idle rpm control, et cetera. Furthermore, for internal combustion engines having gasoline direct injection, not only the air adjustment is power-determining but also the determination of the fuel mass, which is to be injected, the determination of an air/fuel ratio to be adjusted, the input of an injection trace (pre-injection, post-injection), the control of a charge moving flap, et cetera, so that there are, in addition to the described programs, a plurality of additional programs to be provided which have influence on the power of the engine and therefore on the reliability of the motor vehicle.

In another embodiment, the control unit 10 controls an automatic transmission or a brake system, for example, a brake system having an electro-motoric application. In these systems too, programs are provided which are relevant for the reliability of the vehicle, for example, in the control of a brake system for forming the desired brake force, the control of the desired braking force at the individual wheel brakes, the formation of the driver brake command from the actuating signals of the brake pedal, et cetera. Corresponding reliability-relevant functions are also present for the transmission control.

In control systems of this kind, basically two possible fault areas are to be noted. On the one hand, these are definition and software errors in the conversion into the control software while, on the other hand, these are hardware malfunctions in the control element which can occur during operation of the control apparatus. Both fault areas are covered by the monitoring concepts mentioned initially herein. The monitoring concept described below proceeds from a splitting of the handling of these two fault areas and only hardware faults are monitored in the computing element. This permits a command test to be executed as to the reliability-relevant functions, if required, additionally to a process control. The programs allocated to the second and third levels can therefore be omitted because the monitoring is executed via the reliability-relevant functions present in the first level (level 1'). In addition to the command test and, if required, a process control, memory tests are provided which ascertain the operability of the memories of the computing element.

The system and software faults, which are not detected by the monitoring described in the following, are to be determined by suitable measures in the development phase and are to be avoided, for example, by the development of reliability-relevant functions and components by several workers with mutual checks of the work results. Furthermore, these type of faults are recognized from a comparison of the development results to a simulation model and the freedom from error of the software is verified in this way.

For the monitoring in the computation element, only hardware faults remain so that it is sufficient to check only the reliability-relevant functions in the computer, during the control of drive units, the power-determining function paths and thereby the power-determining modules. The check of these functions or program modules takes place via a command test and, if required, via a process control. In the command test, test data, which are selected by the monitoring module 11, are outputted for selected modules. The test computations, which are executed by the modules, are compiled to a response and transmitted to the monitoring module 11. There, a check takes place bit-for-bit with the result data assigned to the respective test data. If the results computed in the command test do not correspond to the expected results, a fault reaction takes place, which, for example, takes place via the monitoring module which is configured as a separate component. The storage components (RAM, ROM) of the control unit and/or of the computing are tested independently of the function check.

The realization of this monitoring measure takes place in that individual reliability-relevant modules and/or computing steps of the reliability-relevant modules are selected and are allocated as a copy or are allocated in the context of a switchover to a level 1', the switchover taking place from time to time. In one embodiment, the copy is stored in a separate memory component. It is advantageous when only parts of the modules of the function level are copied or are applied for the command test because a reduction of a computer load takes place. This is so especially when only individual program steps such as additions, subtractions, et cetera are selected from the individual reliability-relevant modules and are computed in the context of the command test.

The test computations of the command test are executed only slightly less often, preferably as often as the corresponding function computations. A maximum fault reaction time is thereby ensured because a fault detection in the command test can be equated to a present fault function of the entire system.

Additionally, the reliability-relevant functions in level 1 are equipped with a program process control of a known type. Selected inquiries are posed per random generator in the context of this program process control by the monitoring module and are answered by selected program modules or program steps of level 1 and the collected result is transmitted to the monitoring module. The monitoring module compares the result to a norm response assigned to the inquiry. A fault is detected with interruptions.

In the preferred embodiment of the control of a drive unit, the following are provided: reliability-relevant modules for evaluating the accelerator pedal position signals; modules for monitoring the throttle flap actuator; modules for executing an analog-digital converter test; modules which execute the desired torque coordination; modules which execute the idle control; modules for the position control of a throttle flap, et cetera.

In addition to command test and program process control, in an advantageous embodiment, a rapid check of the memory components is executed at least with respect to the reliability-relevant modules. The memory test is executed in short time intervals. As an example of a suitable check of the storage components, a double deposit of the RAM information with complement or a suitable test of the memory component via the relevant cells can be mentioned. In the same manner, one proceeds with the ROM of the control unit 10.

The described monitoring measure ensures the correct operation of the computing element and reliably detects hardware faults in the area of the computing element. A further improvement of the monitoring quality is achieved via an additional program process control which leads to a generally reliable and satisfactory monitoring of the control element via the further additional check of the memory components together with the monitoring function.

Figure 2:
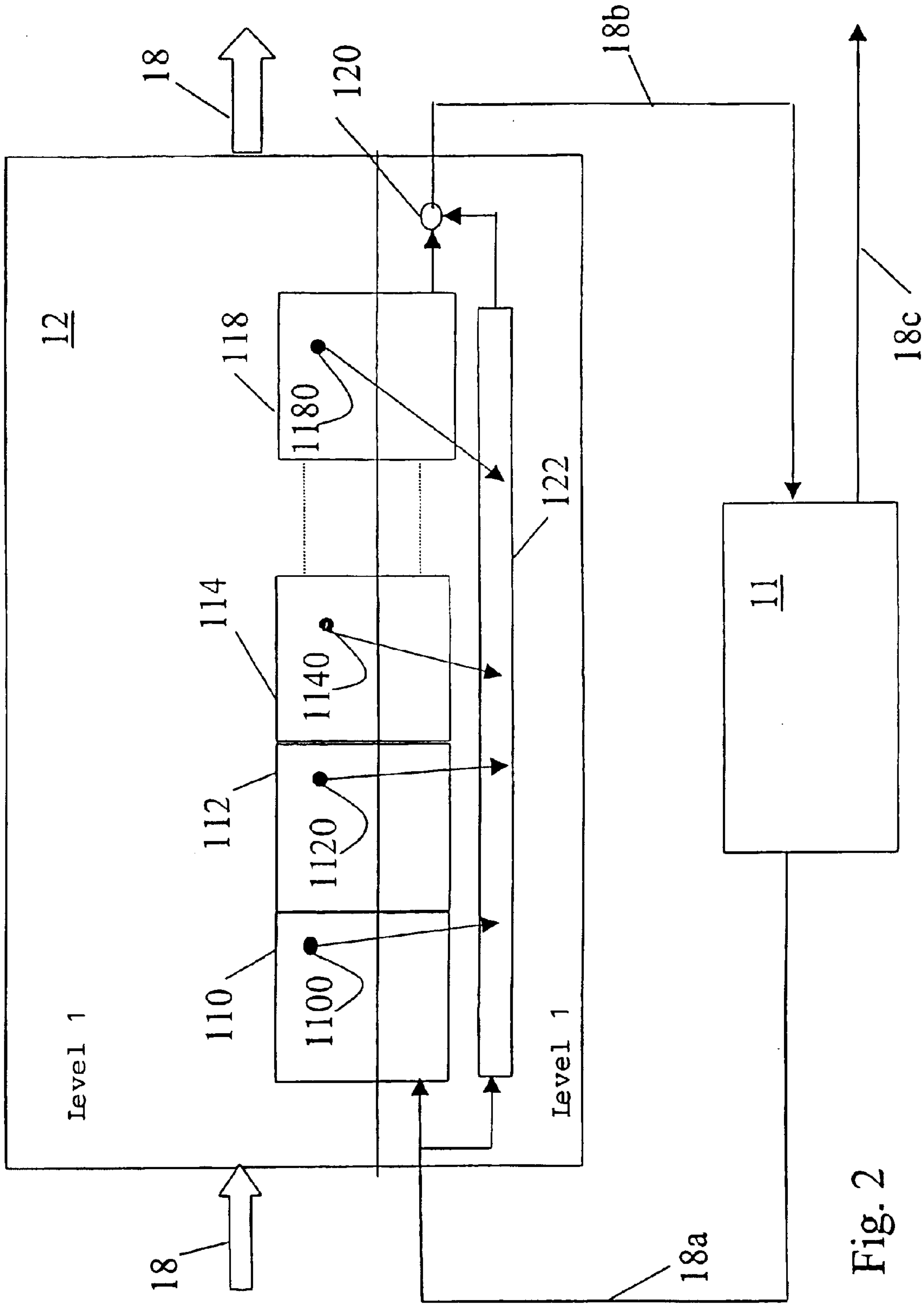
In FIG. 2, an example for monitoring the operation of the computing element is shown with respect to a flowchart.

A preferred embodiment is outlined with respect to the example of a control of an internal combustion engine on the basis of the flowchart of FIG. 2.

FIG. 2 shows a schematic representation of the computing element 12 as well as the separate monitoring module 11. The reliability-relevant functions or program modules are identified by 110, 112 and 114 to 118. Variables are supplied to the computing element via the communications system 18 from which the quantities are determined in program modules (not shown) which quantities are used by the reliability-relevant modules, that is, the power-determining program modules. Furthermore, control signals for controlling the actuating elements are outputted by the computing element via the communications system 18. These control signals were determined by at least one of the program modules 110 to 118. Also, necessary intermediate steps and intermediate computations are not shown which are executed in program modules (not shown) in combination with the formation of the control signals.

In the preferred embodiment of a control of an internal combustion engine, the selected program modules 110 to 118 include programs which determine the power of the engine. For example, the accelerator pedal position is detected by program module 110 and the driver command is formed. The torque coordination is formed with the program module 112 and the idle control is formed with program module 114 and the position control of the throttle flap is carried out by the program module 118. The last one outputs a power-determining control signal on the basis of the intermediate results of the other modules. In addition, other reliability-relevant program modules are present (not shown), for example, the test of the analog/digital converter, the monitoring of the throttle flap actuating element, the evaluation of the throttle flap position signals, et cetera, which are not shown in FIG. 2 for reasons of clarity.

FIG. 2 also shows a procedure, which is described below, for monitoring a computing element 12 and the interrelationship with the monitoring module 11. The following are shown: the two program levels present in computing element 12; the level 1 to which are assigned the programs (for example, 110 to 118) executing the control functions; the level 1' to which are allocated the programs 110 to 118 or parts thereof or copies thereof which form the basis of executing the monitoring function. The computing element 12 communicates with the monitoring module 11 via the communications system 18 which is shown in FIG. 2 by the lines 18*a* and 18*b*. In the event of a fault, the monitoring module 11 intervenes via the communications system 18 (symbolized by line 18*c*) in the control in the sense of an emergency operation or a limiting of the control functions.

The illustrated programs 110 to 118 operate on the operating performance of the motor vehicle with relevance to reliability because they influence the power of the drive unit independently of the driver input. The illustrated programs are allocated to level 1 as function programs and are there processed for executing the control. A process control, which is known from the state of the art, is executed by means of these programs and is triggered via line 18*a* as inquiry-response communications with the monitoring module 11. For this reason, the programs 110 and 118 are also part of the monitoring level 1' of the computing element 12. The collected response (to which all selected program modules contributed) to the inquiry of the monitoring module 11 is supplied via the logic element 120 to the monitoring module 11 via the line 18*b*. The result of the process control can be logically coupled to the result of the command test via the selected programs in the logic element 120. The monitoring module 11 checks the transmitted result with a pregiven value as to correctness and initiates fault reaction measures (via line 18*c*) when there are impermissible deviations.

The command test 122 takes place on the basis of pregiven test data as in the state of the art. Preferably, several sets of data are stored in the memory of the computing element 12 and are selected by the monitoring module 11 via a corresponding command. The command test takes place via selected programs which have a reliability relevant influence and which are especially power determining. In the embodiment shown, these are the programs 110 to 118. Depending upon the embodiment, all programs are integrated into the command test 122. With respect to the command test, the complete program is executed with test data or, as shown in FIG. 2, selected program parts or program steps 1100 to 1180 are executed. For example, specific program steps (for example, addition steps, subtraction steps or multiplication steps) are selected from each program. The selected program steps or program parts are copied into the command test 122 or remain in the original program and are then (either in the copy or in the original) executed for the command test with test data. The result is transmitted to the monitoring module 11 via the logic element 120 and the line 18*b*. In addition to the command test and the process control, the memory test illustrated above takes place.

In another embodiment, the original program itself is used for test computations in lieu of a copy of the original program or parts thereof. The necessary switchover is part of level 1'.

Figure 3A:
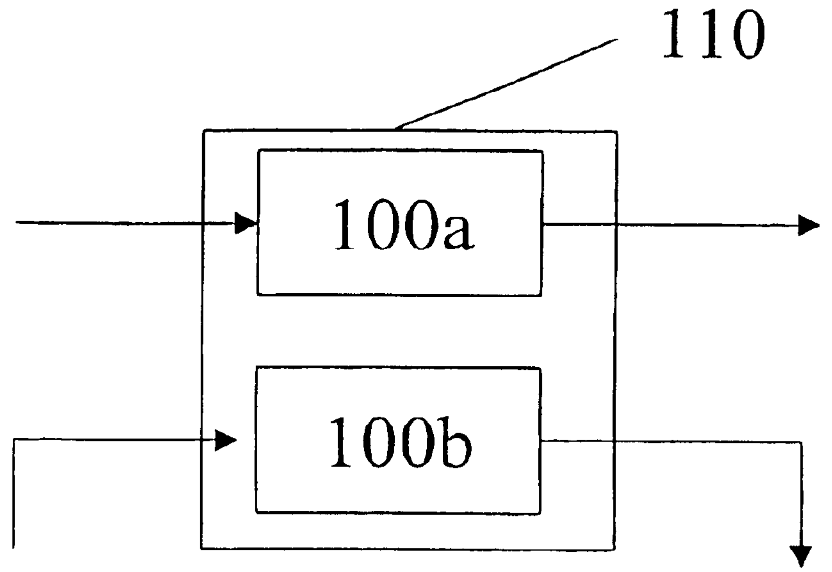
FIG. 3 shows flowcharts for two realizations of the command test level.

In FIG. 3, two specific realization possibilities are shown with respect to an example of program 110. According to FIG. 3*a*, the program 110 as such or individual program steps thereof are copied. The copy 110*b* forms the basis of the command test. The original program 110*a*, which executes the function, remains uninfluenced.

Figure 3B:
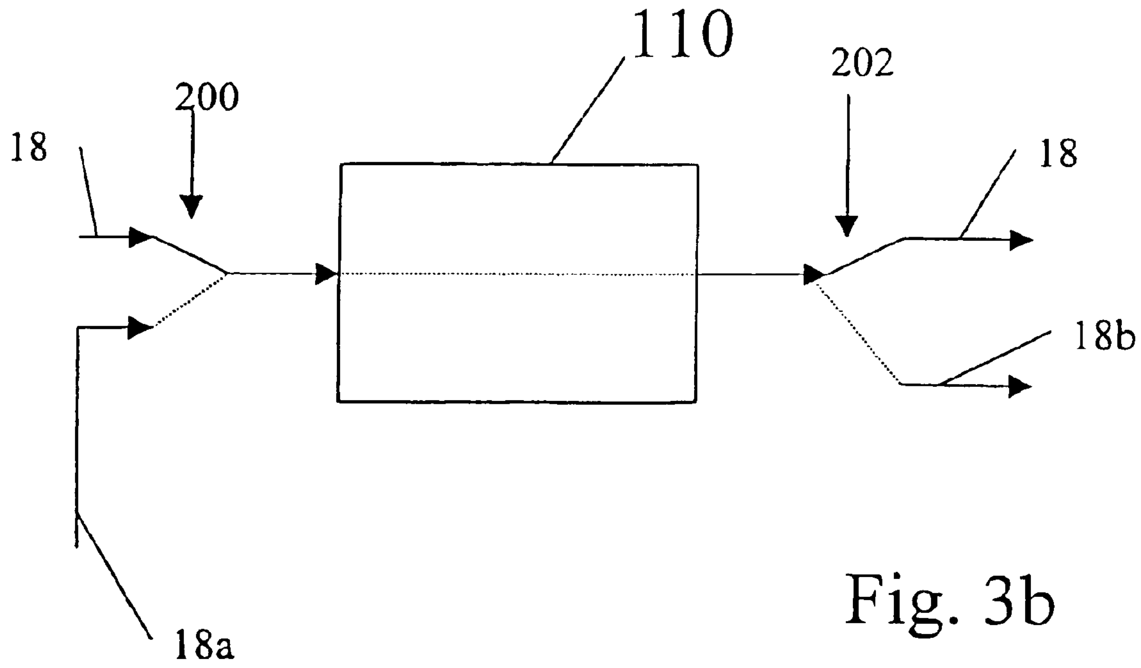

In the second embodiment of FIG. 3*b*, the program 110 is present only once as an original. Switching elements 200 and 202 are switched over into the position shown in phantom outline when the conditions (preferably time conditions) occur for the command test. The program 110 is then executed with the test data 18*a* in lieu of with the supplied original data 18 and the result is outputted to the monitoring module 11 for control. In addition to the complete program 110 for the command test, program parts or program steps of the original program 110 are selected as the basis of the command test.

What is claimed is:

1. A method for monitoring a computing element in a motor vehicle, the computing element including program modules for influencing the operating performance of said motor vehicle, the method comprising the steps of:

utilizing said computing element with the aid of said program modules to generate at least one output quantity for controlling at least one function in said motor vehicle in dependence upon at least one input quantity;

selecting at least one of said program modules or at least a part thereof for monitoring the correct function of the computing element;

running through the at least one selected one of said program modules or the at least one selected part thereof or a copy thereof in said computing element on the basis of test data; and, comparing the result of the test data computation to a pregiven result for fault detection.

2. The method of claim 1, wherein the test is stimulated by a monitoring module.

3. The method of claim 1, comprising the further step of, in addition to the test, providing a process control of at least a selected program module which defines an inquiry-response communication with the monitoring module and is started thereby.

4. The method of claim 1, wherein, in the monitoring module, the result, which is determined by the test and/or by the process control, is compared to a pregiven result and a fault reaction is initiated by said monitoring module when there are impermissible deviations.

5. The method of claim 1, wherein said computing element functions to control the drive unit of said motor vehicle and said at least one selected program module is reliability relevant and preferably power determining as, for example, the detection of the driver command, the idle control, the torque coordination, the throttle flap position control.

6. The method of claim 1, wherein at least a selected program module or the at least one selected part thereof is applied as an original program for the test.

7. The method of claim 1, wherein, in addition to the command test, which defines a test computation with the original program or with a copy of the original program, and/or a process control, a test is carried out of at least the reliability relevant memory cells of the computing element.

8. The method of claim 1, wherein said computing element serves for controlling an automatic transmission or an engine power control or an electrically controlled brake system, preferably a brake system having electro-motoric application.

9. A method for monitoring a computing element in a motor vehicle, the computing element including program modules for influencing the operating performance of said motor vehicle, the method comprising the steps of:

utilizing said computing element with the aid of said program modules to generate at least one output quantity for controlling at least one function in said motor vehicle in dependence upon at least one input quantity;

selecting at least one of said program modules or at least a part thereof for monitoring the correct function of the computing element;

running through the at least one selected one of said program modules or the at least one selected part thereof or a copy thereof in said computing element on the basis of test data;

comparing the result of the test data computation to a pregiven result for fault detection; and, wherein at least a selected program module or the at least one selected part thereof is assigned as an original program to a first level of said computing element (level 1) and is assigned as a copy or in the original for the execution of the test to a second level of the computing element (level 1').

10. An arrangement for monitoring a computing element in a motor vehicle, the arrangement comprising:

a computing element, which includes program modules, with the aid of which the operating performance of the motor vehicle is influenced;

said computing element functioning to generate, with the aid of the program modules, at least one output quantity for controlling at least a function in the motor vehicle in dependence upon at least one input quantity; and, at least one program module or at least a part thereof, which is selected for monitoring the correct function of the computing element, said at least one selected module or said at least one selected part thereof or a copy being run through in the computing element on the basis of test data and the result of the test data computation being compared to a pregiven result for fault detection.

* * * * *

UNITED STATES PATENT AND TRADEMARK OFFICE

CERTIFICATE OF CORRECTION

PATENT NO. : 6,879,891 B1
DATED : April 12, 2005
INVENTOR(S) : Frank Bederna

It is certified that error appears in the above-identified patent and that said Letters Patent is hereby corrected as shown below:

Title page,
Item [22], PCT Filed, delete "Apr. 15, 2000" and insert -- Apr. 5, 2000 -- therefor.
Item [56], References Cited, U.S. PATENT DOCUMENTS, delete "4,896,276 A * 1/1990 Saglimbeni et al .............702/116" and insert -- 4,896,276 A * 1/1990 Saglimbeni et al ............... 364/550 -- therefor; and delete "5,372,410 A * 12/1994 Miller et al .......... 303/122.05" and insert -- 5,372,410 A * 12/1994 Miller et al .......... 303/92 -- therefor.

Signed and Sealed this

Twelfth Day of July, 2005

JON W. DUDAS
*Director of the United States Patent and Trademark Office*